United States Patent
Maslov et al.

(10) Patent No.: US 7,312,592 B2
(45) Date of Patent: Dec. 25, 2007

(54) ADAPTIVE SYSTEM FOR OPTIMIZING EXCITATION CURRENT WAVEFORM PROFILES FOR ELECTRIC MOTORS

(76) Inventors: Boris A. Maslov, 10814 Oldfield Dr., Reston, VA (US) 20191; Guohui Yuan, 903 Main St., Gaithersburg, MD (US) 20878

( * ) Notice: Subject to any disclaimer, the term of this patent is extended or adjusted under 35 U.S.C. 154(b) by 239 days.

(21) Appl. No.: 10/831,102

(22) Filed: Apr. 26, 2004

(65) Prior Publication Data

US 2005/0237013 A1 Oct. 27, 2005

(51) Int. Cl.
*H02P 7/00* (2006.01)
(52) U.S. Cl. ............... 318/432; 318/254; 318/138; 318/439; 318/700
(58) Field of Classification Search ........ 318/432–434, 318/254, 138, 439, 461, 700, 701, 600
See application file for complete search history.

(56) References Cited

U.S. PATENT DOCUMENTS

| | | | |
|---|---|---|---|
| 4,333,042 A | | 6/1982 | Kawada et al. |
| 5,034,675 A | | 7/1991 | Nerowski et al. |
| 5,038,090 A | * | 8/1991 | Kawabata et al. ......... 318/721 |
| 5,258,697 A | * | 11/1993 | Ford et al. ................ 318/498 |
| 5,998,952 A | * | 12/1999 | McLaughlin et al. ....... 318/432 |
| 6,091,216 A | * | 7/2000 | Takahashi et al. ......... 318/254 |
| 6,373,211 B1 | * | 4/2002 | Henry et al. ............... 318/432 |
| 6,449,117 B1 | * | 9/2002 | Waugh .................... 360/78.07 |
| 6,538,412 B1 | | 3/2003 | Klose et al. |
| 6,794,839 B1 | * | 9/2004 | Maslov et al. ............. 318/439 |
| 2002/0105335 A1 | * | 8/2002 | Mir et al. .................. 324/503 |
| 2004/0263101 A1 | * | 12/2004 | Kolomeitsev et al. ..... 318/432 |

FOREIGN PATENT DOCUMENTS

WO  WO 2004/001945 A2  12/2003

* cited by examiner

*Primary Examiner*—Rina Duda
(74) *Attorney, Agent, or Firm*—Proskauer Rose LLP (57) ABSTRACT

An adaptive control system for an electric motor has energization circuitry connected to phase windings of the motor for energization thereof and a controller for generating a control signal corresponding to a profile of an excitation current. The control signal is applied to the energization circuitry to control energization of the phase windings. The energization circuitry provides the excitation current to the phase windings from a power supply. For a present combination of torque and speed, the controller adaptively determine the profile of the excitation current optimal for achieving a particular motor control objective. Excitation current profiles may be optimized to achieve maximum efficiency, maximum torque, minimum torque ripple, minimum core loss, etc.

28 Claims, 8 Drawing Sheets

ADAPTIVE SYSTEM FOR OPTIMIZING EXCITATION CURRENT WAVEFORM PROFILES FOR ELECTRIC MOTORS

RELATED APPLICATIONS

This application contains subject matter related to copending U.S. application Ser. No. 10/290,537, of Maslov et al., filed Nov. 8, 2002, and U.S. application Ser. No. 10/353,075, of Maslov et al., filed Jan. 29, 2003, both commonly assigned with the present application. The disclosures of these applications are incorporated by reference herein.

FIELD OF THE INVENTION

The present invention relates to control of an electric motor, and more particularly, to adaptive optimization of an excitation current waveform profile to achieve desired objectives during motor operation.

BACKGROUND OF THE INVENTION

Depending on motor's applications and user's needs, a motor control strategy may have different objectives. Motors may be controlled to achieve maximum torque, maximum torque per ampere, minimum core loss, maximum efficiency for a given combination of torque and speed, minimum torque ripple for a given combination of torque and speed, maximum constant power speed ratio (CPSR), or other objectives.

For example, recent advances in high-energy batteries, combined with the development of smaller and more powerful motors for electric vehicles, portable appliances and electronic equipment, emphasize the need for a high-efficiency motor control scheme to achieve low power consumption in order to extend battery life, providing longer hours of operation. However, in some applications, such as vehicle driving operation, there may be a need for torque capability in excess of that available from the most efficient motor control scheme. A driver may demand higher torque than the system can accommodate with the high-efficiency motor control scheme. In servo control applications, or when smooth control is required at lower speeds, minimizing the torque ripple becomes the main issue for a control strategy. For control of motors that require wide ranges of constant power operations, such as adjustable-speed driving motors, it is necessary to achieve high constant power speed ratios in the vicinity of 10 or even higher.

Motor control parameters may be optimized to achieve desired objectives. However, variable conditions of motor operation and changing motor's parameters call for frequent re-evaluations of motor control parameters optimized to achieve certain objectives. The need thus exists for a motor control system able to adaptively optimize motor control parameters during motor operation.

DISCLOSURE OF THE INVENTION

The present invention fulfils this need by providing a control system for an electric motor, comprising energization circuitry connected to phase windings of the motor for energization thereof and a controller for generating a control signal corresponding to a profile of an excitation current. The control signal is applied to the energization circuitry to control energization of the phase windings. The energization circuitry may be configured for providing the excitation current to the phase windings from a power supply. In response to motor's operation parameters, such as a combination of torque and speed, the controller adaptively determines the profile of the excitation current optimal for achieving a particular motor control objective. For example, excitation current profiles may be optimized for achieving maximum efficiency, maximum torque, minimum torque ripple, minimum core loss, etc.

The optimal profile may be determined based on analysis of excitation current profiles of different types at varying torque and speed values. Further, the excitation current profiles may be analyzed at various values of their parameters.

The excitation current profiles may include a sinusoidal excitation current profile, an excitation current profile represented by a sinusoidal waveform with a phase advance, an excitation current profile represented by a sinusoidal waveform with odd harmonics, an excitation current profile represented by an arbitrary waveform, an excitation current profile represented by a square wave waveform, an excitation current profile represented by square wave pulses, an excitation current profile represented by a trapezoidal waveform or a trapezoidal waveform with dead zones, etc.

In accordance with an embodiment of the invention, the control system may include at least one excitation current profile look-up table for supplying the controller with a pre-determined excitation current profile optimal for achieving a particular objective at a given combination of torque and speed. Multiple excitation current profile look-up tables may be provided to store excitation current profiles optimal for achieving different motor control objectives. Each of these excitation current profile look-up tables may be assigned for achieving a particular motor control objective. A data acquisition system may be provided for supplying the controller with motor's parameters in real time.

In accordance with one aspect of the invention, an optimization procedure for determining an optimal excitation current profiles involves:
  selecting a first type of excitation current profile,
  setting a first value of motor operation parameters, such as a combination of torque and speed,
  determining a value representing a particular objective of motor control for the first type of excitation current profile at the first motor operation parameter value,
  setting a next value of the motor operation parameter,
  determining the value representing the particular objective of motor control for the first type of excitation current profile at the next value of the motor operation parameter,
  selecting a next type of excitation current profile,
  determining the value representing the particular objective for the next type of excitation current profile at the first and next values of the motor operation parameter, the value representing the particular objective may be determined for various parameters of the excitation profiles of the first and next types, and
  determining an excitation current profile optimal for achieving the particular objective at a given value of the motor operation parameter based on the values representing the particular objective for the first and next types of excitation profile at the first and next values of the motor operation parameter.

In accordance with another aspect of the invention, an adaptive control system may be provided for a multiphase motor having a rotor and a plurality of stator phase components, each of which comprising a phase winding formed on a core element. The adaptive control system provides supplying each phase of the motor with a control signal corresponding to an excitation current profile optimal for achieving a particular objective of motor control.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

As discussed above, a motor control strategy may have different objectives, such as achieving maximum torque, maximum torque per ampere, minimum core loss, maximum efficiency for a given combination of torque and speed, minimum torque ripple for a given combination of torque and speed, maximum constant power speed ratio (CPSR), etc. Motor control parameters may be optimized to achieve any of these objectives. In accordance with the present invention, the profile of motor's excitation current is optimized to achieve a particular objective of motor control. For example, excitation current profiles for a wide range of torque and speed may be optimized to achieve the maximum efficiency $\eta_{max}$.

Figure 1:
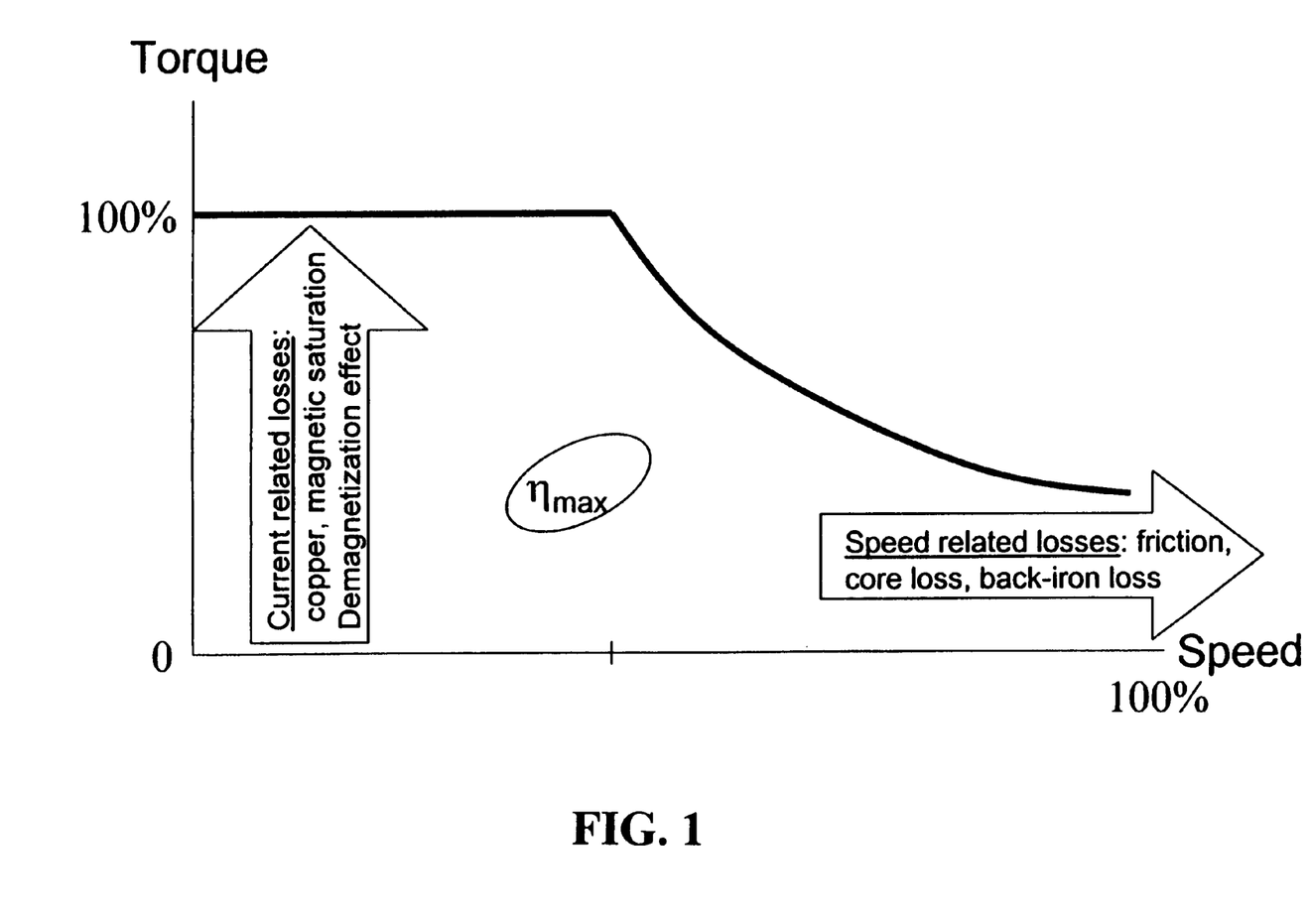
FIG. 1 illustrates various factors affecting efficiency in various areas of the torque-speed characteristic.

FIG. 1 is a diagram showing typical torque-speed characteristics of an electric motor. As illustrated in this diagram, at lower speeds when torque is at about 100% of its maximum value, current-related losses, including copper and magnetic saturation, and demagnetization effect, dominate among factors affecting motor efficiency. By contrast, when speed reaches a region close to about 100% of its maximum value, speed-related losses, including friction, core loss and back-iron loss, become dominant. As a result of these losses affecting the motor's efficiency, the maximum efficiency $\eta_{max}$ of the motor is restricted to a small contour on the torque-speed characteristic.

Figure 2:
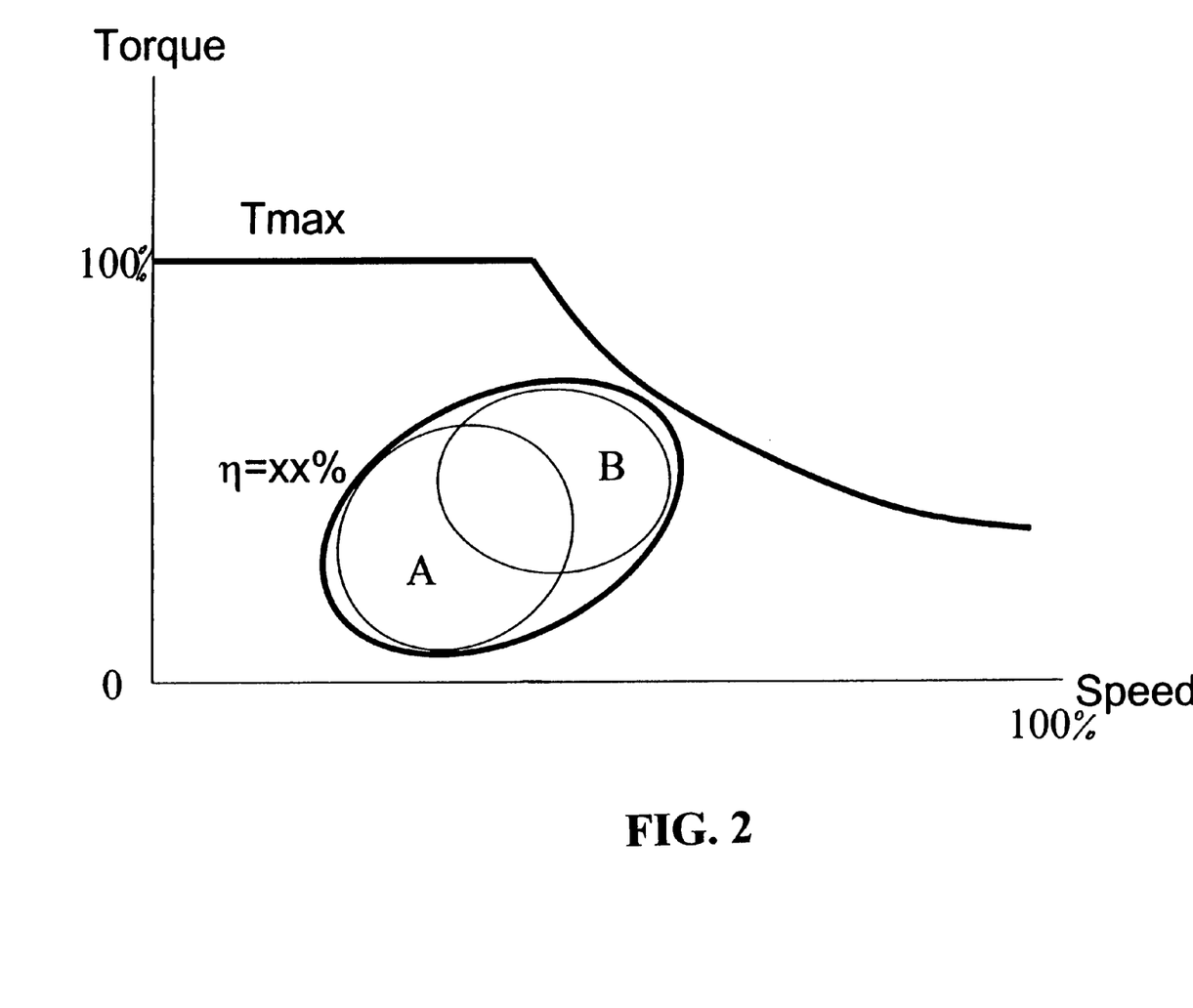
FIG. 2 illustrates expanding maximum efficiency contour by selecting an optimal excitation current profile in accordance with the present invention.

As illustrated in FIG. 2, the maximum efficiency contour may be expanded by selecting the excitation current profile, for example, profile A or profile B, that makes it possible to achieve the highest possible efficiency $\eta$ at any given combination of torque and speed. Hence, the optimum excitation current profile for achieving the maximum efficiency, may be a type of excitation current profile, which provides the maximum efficiency at a particular combination of torque and speed.

Figure 3A:
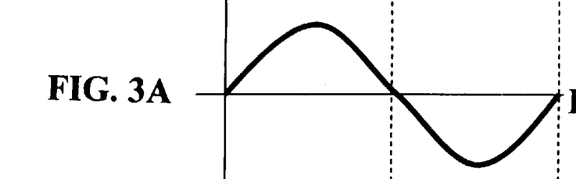
FIGS. 3A-3H shows waveforms representing various excitation current profiles selected in accordance with the present invention.
Figure 3B:
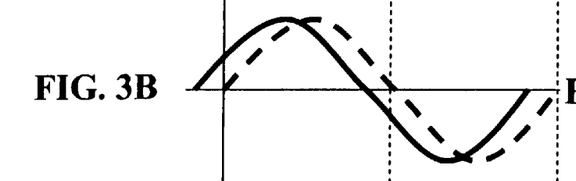
Figure 3C:
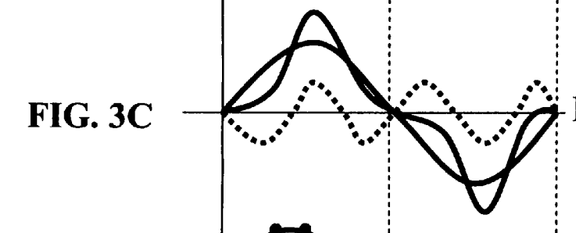
Figure 3D:
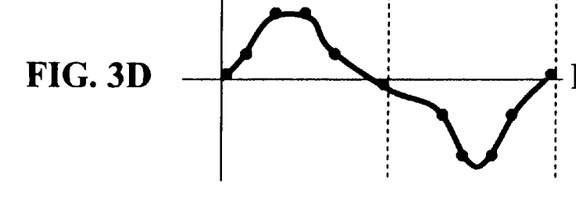
Figure 3E:
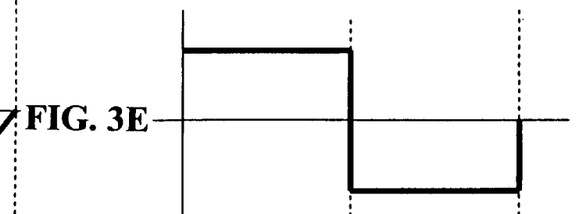
Figure 3F:
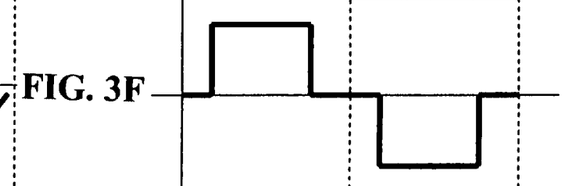
Figure 3G:
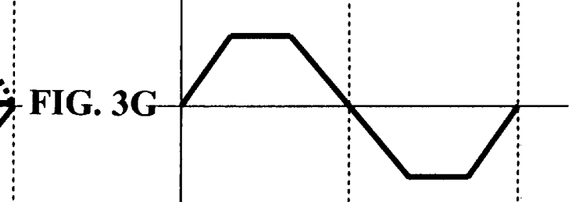
Figure 3H:
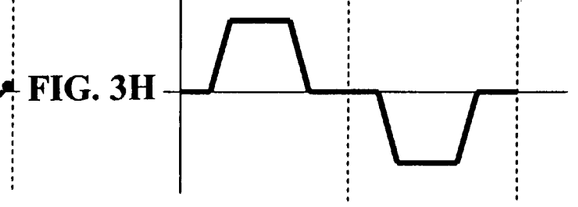

FIGS. 3A to 3H are waveform diagrams illustrating examples of various types of excitation current profiles that may be selected to achieve a desired objective of motor control. In particular, FIG. 3A presents a sinusoidal excitation current profile, FIG. 3B shows an excitation current profile represented by a sinusoidal waveform with a phase advance, FIG. 3C depicts an excitation current profile represented by a sinusoidal waveform with odd harmonics, FIG. 3D shows an excitation current profile represented by an arbitrary waveform, FIG. 3E illustrates an excitation current profile represented by a square wave waveform, FIG. 3F shows an excitation current profile represented by square wave pulses, FIG. 3G depicts an excitation current profile represented by a trapezoidal waveform, and FIG. 3H shows an excitation current profile represented by a trapezoidal waveform with dead zones.

Figure 4:
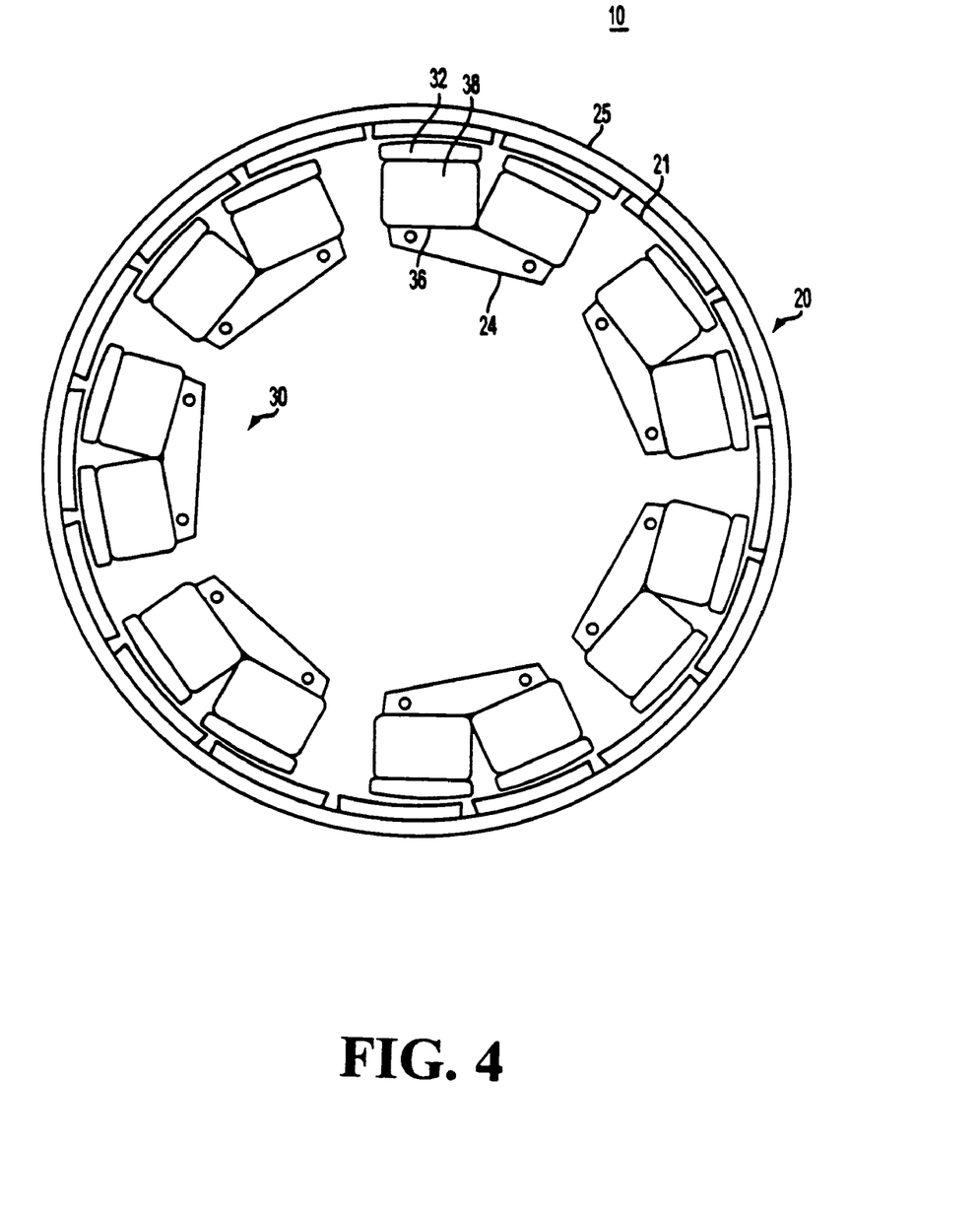
FIG. 4 illustrates a multiphase permanent magnet electric motor that may be controlled in accordance with a motor control scheme of the present invention.

The present invention is applicable to a multiphase permanent magnet electric motor 10 (FIG. 4) having autonomous segmented electromagnetic cores, although the invention can be used with various other electric motors. The motor 10 includes a rotor member 20 with an annular ring structure having permanent magnets 21 substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally U-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate and magnetically isolated from adjacent stator core elements. The stator elements 36 are secured to a non-magnetically permeable support structure, thereby forming an annular ring configuration. This configuration eliminates emanation of stray transformer flux effects from adjacent stator pole groups. The stator electromagnets are thus autonomous units comprising respective stator phases. The concepts of the invention, more fully described below, are also applicable to other permanent magnet motor structures, including a unitary stator core that supports all of the phase windings.

Figure 5:
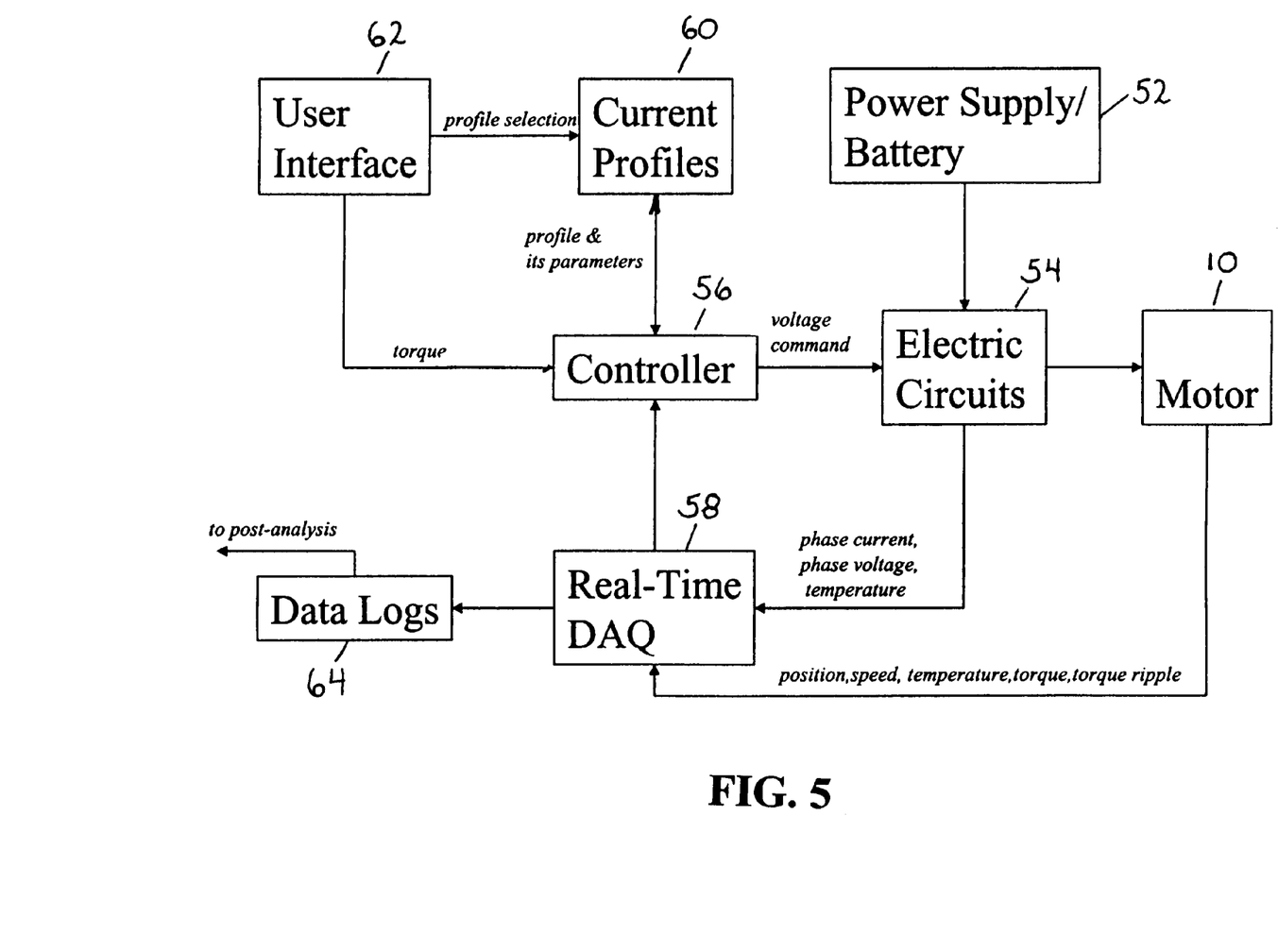
FIG. 5 is a block diagram of a motor control system of the present invention.

FIG. 5 illustrates a motor control system in accordance with the present invention. A plurality of stator phase windings 38 (FIG. 4) of the multiphase motor 10 are switchably energized by driving current supplied from a DC power supply 52 via electric circuits 54, which may have electronic switch sets that are coupled to a controller 56 via a pulse width modulation converter and gate drivers. Each phase winding is connected to a switching bridge having control terminals connected to receive pulse modulated output voltages from the controller 56. Alternatively, the switching bridges and gate driver components may be replaced by amplifiers linked to the controller output voltages.

A real-time data acquisition system (DAQ) 58 may be connected to a rotor position and speed sensor for providing rotor position and speed signals to the controller 56. The sensor may comprise a well-known resolver, encoder or their equivalents and a speed approximator that converts the position signals to speed signals in a well-known manner. A temperature sensor may provide the DAQ 58 with motor's temperature. Also, the DAQ 58 may receive information on torque delivered by the motor 10, and its torque ripple.

The controller 56 may comprise a microprocessor or equivalent microcontroller, such as Texas Instrument digital signal processor TMS320LF2407APG. Coupled to the controller may be RAM and ROM memories for storing programs and data used in the controller's operation. An excitation current profile memory 60 is shown separately in the drawing for purposes of illustration of the inventive concepts. The profile memory 60 may comprise a look-up table for storing pre-determined optimal excitation current profiles selectable in accordance with driving conditions. As discussed in more detail below, the optimal excitation current profiles stored in the profile memory 60 are selected based on a user's torque command $\tau_d$ provided via a user interface 62, rotor position $\theta$ and speed $\omega$ that may be determined by the position/speed sensor. A data log system 64 may collect information for post-analysis conducted to determine optimal profiles for achieving selected objectives of the motor control.

In order to develop the desired phase currents, the following per-phase control voltage is applied by the controller 56 to the electric circuits 54:

$$V_i(t)=L_i dI_{di}/dt+R_i I_i+E_i+k_{si}e_i$$

where i=1, 2, . . . $N_s$;

$N_s$ is the number of stator phase windings;

$V_i(t)$ is the voltage across the phase winding;

$I_{di}(t)$ is the desired excitation phase current;

$I_i(t)$ is the measured excitation phase current;

$R_i$ is the winding resistance;

$E_i(t)$ is the back—EMF;

$L_i$ is the winding self-inductance;

$k_{si}$ is the current loop feedback gain; and $e_i$ is the phase current error.

As described in more detail below, the desired excitation phase current $I_{di}(t)$ optimal for achieving a particular objective of motor control is provided by the profile memory 60. The desired excitation phase current $I_{di}(t)$ defines the manner in which the motor control system responds to the torque command from the user. A significant aspect of the present invention is adaptive selection of an excitation phase current profile optimal for achieving a particular motor control objective, such as the maximum efficiency, the minimum torque ripple, etc., among profiles of multiple types described above.

Each type of excitation current profile has unique characteristics with respect to achieving a particular motor control objective, in comparison to other profiles. For example, a sinusoidal excitation current profile provides higher motor efficiency at lower speeds than other types of excitation current profile, and practically ripple-free torque output when back-EMF is sinusoidal. A square wave excitation current profile provides higher torque but lower efficiency than the sinusoidal profile. A current profile represented by a sinusoidal waveform with a phase advance makes it possible to achieve higher torque at higher speeds in comparison to the sinusoidal profile with higher efficiency in comparison to the square wave profile. By enabling the rise and fall time control, a trapezoidal excitation current profile reduces torque ripples compared to the square wave profile, and may provide higher efficiency than other types of current profiles. Hence, by determining a profile of excitation phase current $I_{di}(t)$ that provides the highest parameter representing a selected motor control objective for a given combination of torque and speed, the motor control system of the present invention makes it possible to adaptively optimize motor performance with respect to the selected motor control objective.

Figure 6:
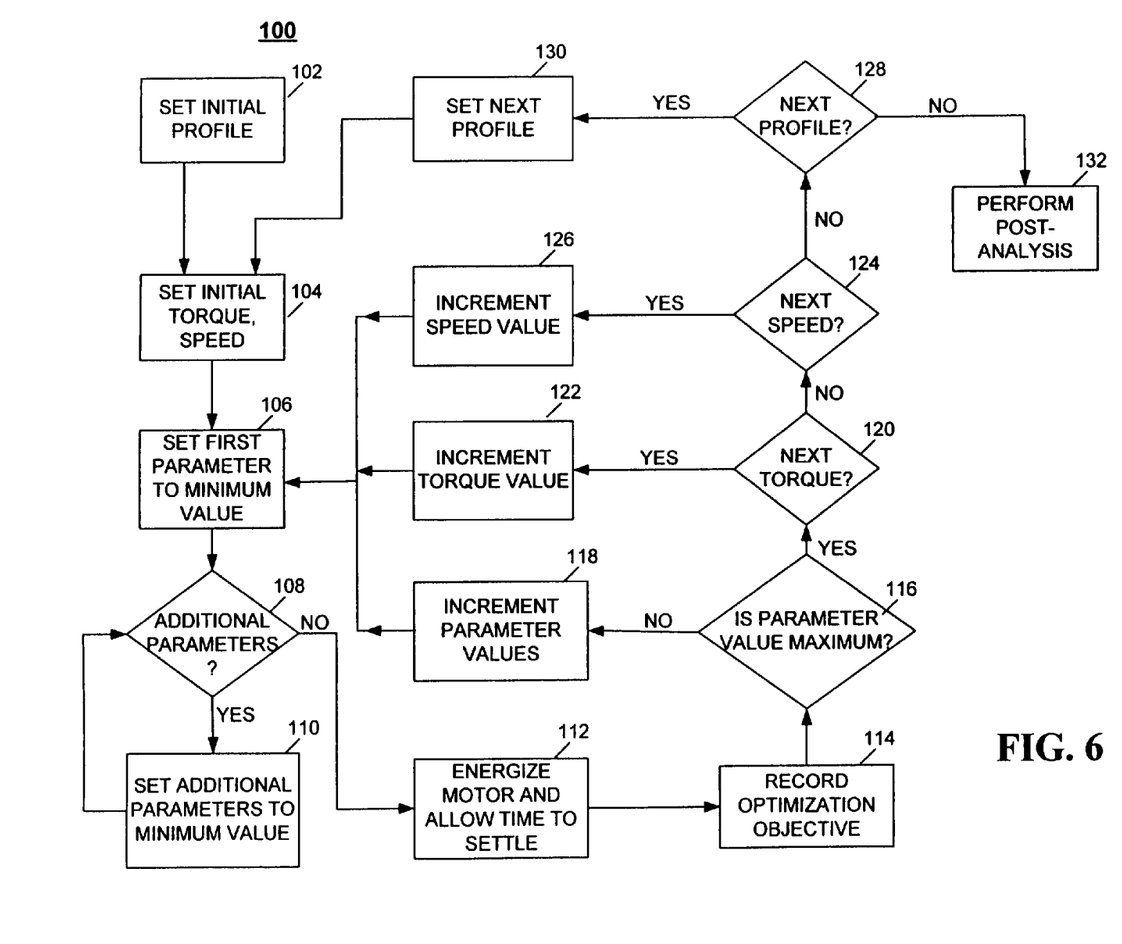
FIG. 6 is a flow chart of an excitation current profile optimization procedure of the present invention.

FIG. 6 is a flow chart illustrating an optimization procedure 100 for determining an optimal excitation current profile to be stored in the profile memory 60. The optimization procedure may be carried out based on motor operations or by modeling operation conditions of the motor 10. The optimization procedure is initiated by selecting an initial excitation current profile (step 102). The initial excitation current profile may be any possible profile of excitation phase current $I_{di}(t)$, for example, any profile illustrated in FIGS. 3A-3H.

The speed and torque of the motor 10 are set at desired initial values (step 104). As the torque of the motor cannot be set directly, a value of phase current enabling the motor to deliver a desired initial torque value may be set instead of the torque value. The values of motor speed and phase current may be set as a desired percentage of the maximum speed and phase current values.

Parameters of an excitation current profile define particular characteristics of the waveform representing that profile. For example, the phase advance value is a parameter of an excitation current profile represented by a sinusoidal waveform with a phase advance the phase advance value, together with the magnitude and phase of odd harmonics, are parameters of an excitation current profile represented by a sinusoidal waveform with odd harmonics. Desired current values for selected phase angles are parameters of an excitation current profile represented by an arbitrary waveform. The phase advance and the duty cycle are parameters of an excitation current profile represented by square wave pulses. The phase advance, the rise time and the fall time are parameters of an excitation current profile represented by a trapezoidal waveform. These parameters, together with durations of dead zones, are parameters of an excitation current profile represented by a trapezoidal waveform with dead zones.

During the optimization procedure, the parameters of the selected excitation current profile may be initially set at their minimum valid values. In particular, in step 106, a first parameter of the selected profile is set at its minimum valid value. If the selected profile has one or more additional parameters (step 108), these parameters are also set at their minimum valid values (step 110). For some excitation current profiles such as a sinusoidal profile or square wave profile, the optimization procedure may be performed without setting particular parameters of the profiles.

After setting parameters at their minimum valid value, the motor 10 is energized and allowed to settle for a predetermined time period, for example, for several seconds (step 112). After the motor 10 reaches steady operation conditions, a selected motor control objective, such as the efficiency of the motor, is measured and recorded (step 114).

The optimization procedure may involve incrementing each parameter of the selected excitation current profile by a predefined increment until the maximum valid value of the respective parameter is reached. Hence, if the respective profile is not set at its maximum valid value (step 116), it is incremented by a predefined increment (step 118). Steps 112 and 114 are repeated for each new value of each profile parameter.

When each parameter of the selected excitation current profile reaches its maximum valid value (step 116), the initial value of torque is incremented by a predefined increment. As discussed above, the torque may be represented by the value of the phase current enabling the motor 10 to deliver the corresponding torque. Therefore, the value of the phase current may be incremented to obtain the desired torque increment. Hence, when the torque increment is needed (step 120), the optimization procedure 100 goes to step 122 to increment the phase current value in order to achieve the predefined torque increment. For the new torque value, the steps 106-118 are repeated to measure and record the selected motor control objective at all parameter values of the selected profile.

Then, the initial value of the motor speed is incremented by a predefined increment to continue measurements at the next speed value. When the speed increment is needed (step 124), the optimization procedure 100 goes to step 126 to increment the motor speed by the predefined value. For the new speed value, the steps 106-118 are repeated to measure and record the selected motor control objective at multiple parameter values of the selected profile. Thereafter, these steps are carried out for multiple values of torque and speed until the motor torque and speed reach their maximum values.

After measuring and registering the selected motor control objective for the initially selected excitation current profile, the optimization procedure 100 may be carried out for a next excitation current profile, which may be selected among available profiles such as shown in FIGS. 3A-3H. Hence, if the next profile is selected (step 128), the optimization procedure 100 moves to step 130 to set another excitation current profile. Thereafter, steps 104-126 are carried out for that excitation current profile to measure and record the selected motor control objective at multiple parameter values of the excitation current profile for multiple values of the motor speed and torque.

Figure 7:
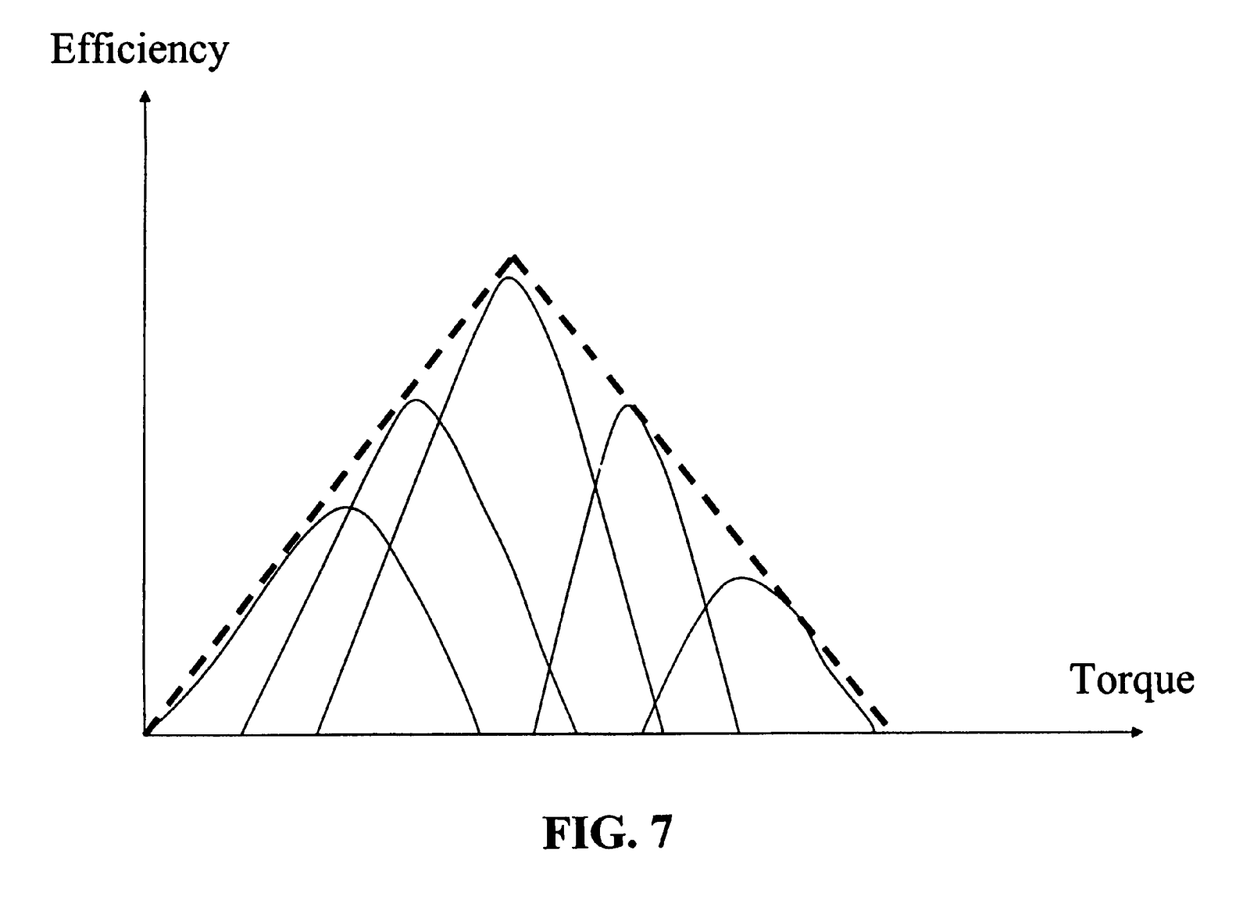
FIG. 7 illustrates a maximum efficiency envelope for a selected excitation current profile.

When the steps 104-126 are completed for all selected excitation current profiles, the optimization procedure 100 moves to step 132 to perform post-analysis. First, for each excitation current profile and each motor speed value involved in the measurements of the selected motor control objective, the post analysis procedure determines the most desirable values of the selected motor control objective at various values of torque. For example, FIG. 7 shows an envelope defining the maximum efficiency for a particular excitation current profile as a function of torque. The maximum efficiency envelope is determined for each motor speed value involved in the efficiency measurements as a curve tangent to every one of curves defining the maximum efficiency values registered in step 114 for each torque value. These maximum efficiency values are selected among the efficiency values registered for various parameters of each excitation current profile for the respective torque value.

Based on the determined values of the selected motor control objective for multiple excitation current profiles, the post-analysis procedure determines a three-dimensional distribution of the optimal motor control objective along the motor speed and torque ranges for all analyzed excitation current profiles. For example, FIG. 8 depicts a three-dimensional (3-D) distribution of the maximum efficiency in the Cartesian coordinate system XYZ, in which the X-axis represents the motor speed, the Y-axis corresponds to the torque, and the Z-axis represents the maximum efficiency.

Figure 8:
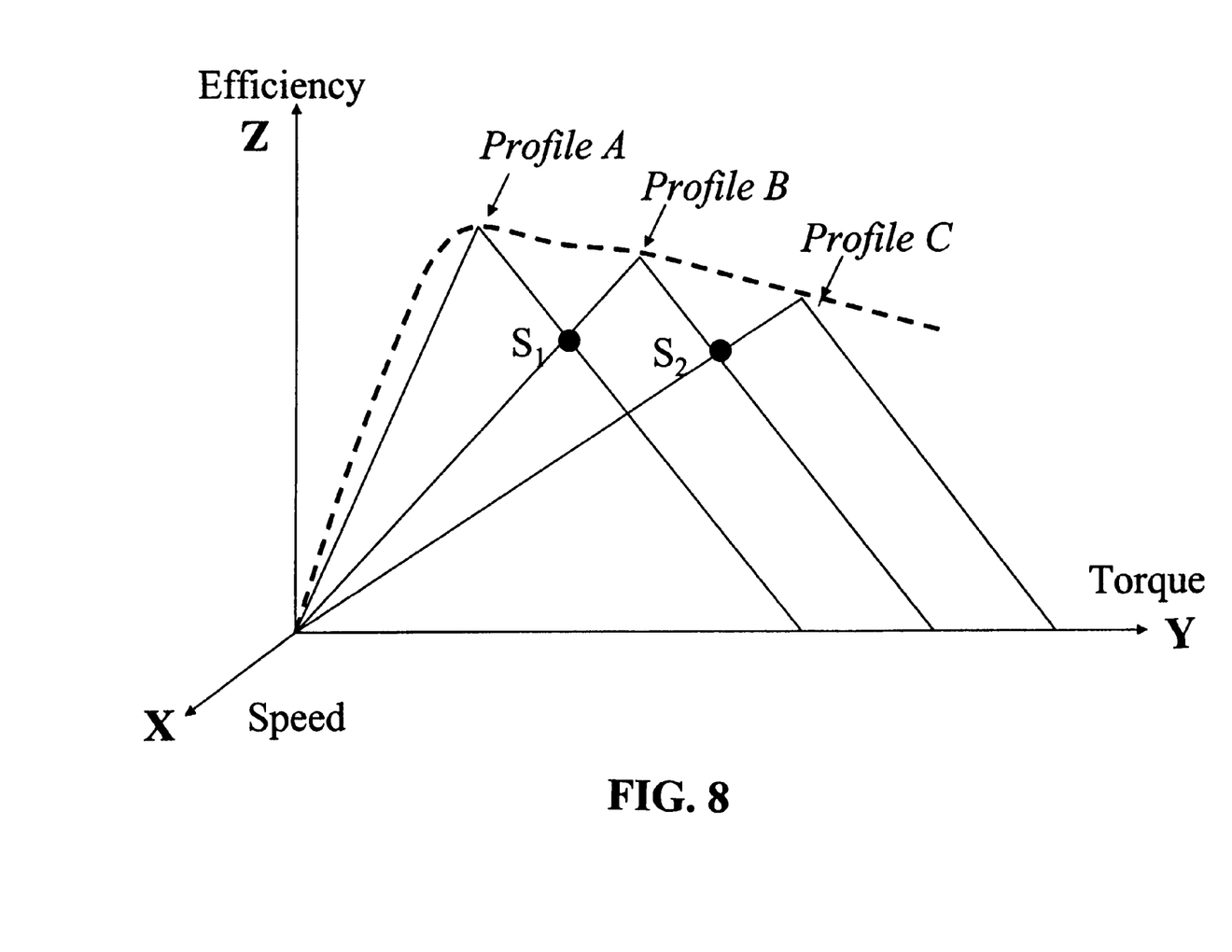
FIG. 8 illustrates a multiple efficiency envelope for multiple excitation current profiles.

For the sake of illustration, the maximum efficiency distribution in FIG. 8 is based on the maximum efficiency envelopes for three excitation current profiles A, B and C. However, one skilled in the art would realize that the distribution of a selected motor control objective may be developed based on any selected number of analyzed excitation current profiles.

An excitation current profile providing the maximum efficiency value for a given point on the plane defined by the motor and torque axes is considered to be a profile optimal for achieving the maximum efficiency for that combination of speed and torque. Similarly, an excitation profile enabling the motor to achieve any objective discussed above, such as maximum torque, minimum torque ripple, etc., is considered to be an optimal profile for that particular objective.

As illustrated in FIG. 8, each of profiles A, B and C provides the maximum efficiency in a certain area of the surface defined by the motor and torque axes. Hence, the respective profile is an optimal profile for speed-torque combinations corresponding to the area where the maximum efficiency is achieved. Points $S_1$ and $S_2$ in FIG. 8 illustrate points in which an optimal profile changes from one particular profile to another. For example, for a speed-torque combination corresponding to the point $S_1$, profile B becomes optimal for achieving the maximum efficiency, instead of profile A; for a speed-torque combination corresponding to the point $S_2$, profile C becomes optimal for achieving the maximum efficiency, instead of profile B.

The optimal profiles determined for multiple combinations of speed and torque are loaded into a look-up table of the profile memory 60 to provide the controller 56 with the excitation phase current $I_{di}(t)$ having profile optimal for achieving a particular objective of motor control at a given speed-torque combination. The profile memory 60 may have a look-up table assigned for each of various motor control objectives. For example, the profile memory 60 may have a maximum efficiency look-up table, a maximum torque look-up table, a minimum torque ripple look-up table, and/or a minimum core loss look-up table, etc., with excitation current profiles optimal for achieving the respective motor control objective. Depending on a motor control strategy, the user is enabled to select a look-up table assigned for achieving a desired objective.

For each combination of torque command $\tau_d$ and actual speed $\omega$, each of the look-up tables in the profile memory 60 stores the value of the excitation phase current $I_{di}(t)$ optimal for achieving the respective motor control objective. Further, each look-up table in the profile memory 60 may store the term $L_i dI_{di}/dt$, and the back-EMF value $E_i$ used in the calculation of the voltage $V_i(t)$. The value $E_i$ may be selected from the lookup table based on a combination of speed and rotor position.

The controller 56 interacts with the profile memory to read the required data for the present torque-speed combination, and calculate a control signal $V_i(t)$ based on the read data for the excitation current profile optimal for achieving a selected motor control objective. Then, the controller 56 successively outputs calculated control signals $V_i(t)$ for each phase to the electric circuits 54 for individual energization of respective phase windings in a sequence established in the controller 56. Each successive control signal $V_i(t)$ is related to the particular current sensed in the corresponding phase winding, and the immediately sensed rotor position and speed.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, optimal excitation current profiles for achieving various motor control objectives may be pre-determined prior to motor operation. Alternatively, real-time optimization may be implemented on the fly during motor operation, or optimization systems, such as artificial neural networks, may be used to obtain optimal excitation current profiles.

As can be appreciated, the motor of the invention can be utilized in a vehicle drive and in a wide range of other applications. While it is preferred, in the implementation of a vehicle drive, that the rotor surround the stator, other applications may find advantageous utility with the stator surrounding the rotor. Thus, it is within the contemplation of the invention that each inner and outer annular member may comprise either the stator or rotor and may comprise either the group of electromagnets or group of permanent magnets.

Although the invention is disclosed with an example of separated magnetic circuits for each electric phase of the motor, the invention is applicable to other motor arrangements such as motors containing a common magnetic path. Hence, it is to be understood that the invention is capable of changes and modifications within the scope of the inventive concept as expressed herein.

What is claimed is:

1. A control system for an electric motor comprising:
   energization circuitry connected to phase windings of the motor for energization thereof; and
   a controller for generating a control signal corresponding to a profile of an excitation current, said control signal being applied to said energization circuitry to control energization of said phase windings,
   said controller adaptively determining the profile of the excitation current optimal for achieving a particular objective of motor control for a motor torque and a motor speed.

2. The control system of claim 1, wherein the controller is configured to determine the optimal profile based on analysis of excitation current profiles of different types.

3. The control system of claim 1, wherein the controller is configured to determine the optimal profile for achieving the particular objective at varying torque and speed values.

4. The control system of claim 1, wherein the optimal excitation current profile is determined based on varying value of an excitation current profile parameter.

5. The control system of claim 1, further comprising at least one excitation current profile look-up table for supplying the controller with a pre-determined excitation current profile optimal for achieving a particular objective at given torque and speed.

6. The control system of claim 1, further comprising multiple excitation current profile look-up tables containing excitation current profiles optimal for different motor control objectives.

7. The control system of claim 6, wherein each of the multiple excitation current profile look-up tables is assigned for storing excitation current profiles optimum for achieving a particular motor control objective.

8. The control system of claim 1, wherein the controller is configured for generating the control signal corresponding to a sinusoidal excitation current profile.

9. The control system of claim 1, wherein the controller is configured for generating the control signal corresponding to an excitation current profile represented by a sinusoidal waveform with a phase advance.

10. The control system of claim 1, wherein the controller is configured for generating the control signal corresponding to an excitation current profile represented by a sinusoidal waveform with odd harmonics.

11. The control system of claim 1, wherein the controller is configured for generating the control signal corresponding to an excitation current profile represented by an arbitrary waveform.

12. The control system of claim 1, wherein the controller is configured for generating the control signal corresponding to an excitation current profile represented by a square wave waveform.

13. The control system of claim 1, wherein the controller is configured for generating the control signal corresponding to an excitation current profile represented by square wave pulses.

14. The control system of claim 1, wherein the controller is configured for generating the control signal corresponding to an excitation current profile represented by a trapezoidal waveform.

15. The control system of claim 1, wherein the controller is configured for generating the control signal corresponding to an excitation current profile represented by a trapezoidal waveform with dead zones.

16. The control system of claim 1, further comprising a data acquisition system for supplying the controller with the motor torque and the motor speed in real time.

17. The control system of claim 1, wherein the energization circuitry is configured for providing the excitation current to the phase windings from a power supply.

18. A method of controlling a motor, comprising the steps of:
   selecting a first type of excitation current profile,
   setting a first value of a combination of a motor torque and a motor speed,
   determining a value representing a particular objective of motor control for the first type of excitation current profile at the first value,
   setting a next value by incrementing the first value by a predefined increment,
   determining the value representing the particular objective of motor control for the first type of excitation current profile at the next value,
   selecting a next type of excitation current profile,
   determining the value representing the particular objective for the next type of excitation current profile at the first and next values, and
   determining an excitation current profile optimal for achieving the particular objective at a given value of the combination of the motor torque and the motor speed based on the values representing the particular objective for the first and next types of excitation current profiles at the first and next values.

19. The method of claim 18, further comprising the step of adaptively controlling the motor during motor operation by selecting the excitation current profile optimal for achieving the particular objective for a given combination of a motor torque and a motor speed.

20. The method of claim 18, wherein optimal excitation current profiles are selected for different motor control objectives.

21. The method of claim 18, wherein the value representing the particular objective is determined for various combinations of torque and speed.

22. The method of claim 18, wherein the value representing the particular objective is determined for various parameters of the excitation profiles for the first and next types.

23. An adaptive control system for a multiphase motor operable over a range of speeds and torques, said motor having a plurality of stator phase components and a rotor, each stator phase component comprising a phase winding formed on a core element, said system comprising:

energization circuitry connected to the stator phase windings for selective connection of each phase winding to a power source for energization thereof;

a controller for generating control signals corresponding to an excitation current profile optimized for achieving a particular objective of motor control, said control signals being applied to said energization circuitry for energization of said phase windings; and an excitation current profile memory having stored therein a plurality of selectable excitation current profiles optimal for achieving the particular objective at various combinations of motor torque and motor speed, said memory being accessible by said controller for selection of one of said optimal current profiles appropriate for a present combination of motor speed and motor torque.

24. The system of claim 23, wherein the excitation current profile memory includes look-up tables containing excitation current profiles optimal for achieving different motor control objectives at various combinations of torque and speed.

25. The system of claim 24, wherein the motor control objectives includes maximum efficiency of the motor.

26. The system of claim 24, wherein the motor control objectives includes maximum torque of the motor.

27. The system of claim 24, wherein the motor control objectives includes minimum torque ripple of the motor.

28. The system of claim 24, wherein the motor control objectives includes minimum core loss of the motor.

* * * * *